Figure 1:
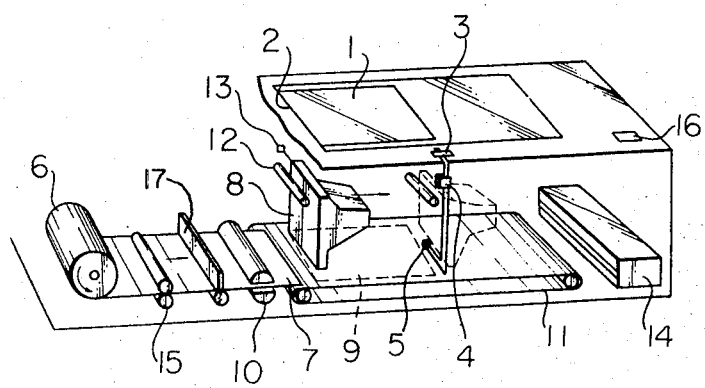

United States Patent
Kakii et al.

[15] 3,656,851
[45] Apr. 18, 1972

[54] COPYING APPARATUS

[72] Inventors: Shunichiro Kakii; Akira Saito, both of Tokyo, Japan

[73] Assignee: Iwatsu Electric Company Limited, Tokyo, Japan

[22] Filed: Mar. 4, 1970

[21] Appl. No.: 16,391

[30] Foreign Application Priority Data

Mar. 10, 1969 Japan..................................44/18173

[52] U.S. Cl......................................355/66, 355/8, 355/13, 355/29
[51] Int. Cl.......................................................G03b 27/70
[58] Field of Search ..................................355/66, 29, 8, 13

[56] References Cited
UNITED STATES PATENTS 3,533,691  10/1970  Suzuki et al. ............................355/13

Primary Examiner—Samuel S. Matthews
Assistant Examiner—E. M. Bero
Attorney—Milton J. Wayne

[57] ABSTRACT

A method and apparatus for copying an original including an optical exposure device reciprocating in a passage between the original and a sheet of copy paper. The exposure device moves in the same direction as the copy paper being supplied and starts from a fixed standard line to move to a stop line that varies with the length of the original to thereby determine and cut the length of the copy paper to be the same length as the original. The exposure device then returns to its starting position while scanning an image on the original.

10 Claims, 9 Drawing Figures

PATENTED APR 18 1972

3,656,851

SHEET 1 OF 4

INVENTOR

BY *Milton J. Wayne*

ATTORNEY

COPYING APPARATUS

The present invention relates to an optical copying method and apparatus wherein an optical scanning exposure is operated in cooperation with feeding and cutting operations of a photosensitive sheet material.

Such a copying device, as being capable of copying the light and shaded parts of the original surface applying a lens system, is utilized not only for copying one side of printed matter but for both sides of printing, books, clothes, several kinds of patterns etc., and its utility value is excellent. There are various kinds of copying apparatus, but in order to provide compact devices, a scanning exposure method, wherein an image of an original is gradually focused into an image on the photosensitive sheet with the scanning operation, is preferably utilized. In relation to the above-mentioned scanning exposure methods, the following three processes are generally well-known;

1. A lens system of an optical image scanning apparatus is stationary and the table for the originals and photosensitive sheet is movable (hereinafter referred to as the first process);
2. The table for the originals and the photosensitive sheet is stationary, but the lens system is movable (hereinafter referred to as the second process); and
3. The table for the original is stationary, but lens system and the photosensitive sheet are movable (hereinafter referred to as the third process).

Among the above-described three processes, the second process is the simplest and most reliable method from stand points of synchronizing operations, mechanisms and operative characteristics.

However, according to the conventionally applied second process, the time required for transfer of the lens system is constant regardless of the size or length of the originals. In other words, the time required for scanning and exposing the originals is independent of the size or length of originals. Therefore, in the case of copying an original having a small size or short length, considerable waste time is inevitable.

A main object of the present invention is to provide a method of and apparatus for copying wherein the time required for the copying process is simply adjustable in accordance with the length or size of the originals.

Another object of the present invention is to provide a compact-type copying apparatus having a high copying capacity.

In the copying process in accordance with the present invention, a photosensitive sheet material is delivered from a supply source and cut concurrently in accordance with a definite length of an original by a cutting device. At this time, a transfer distance of an optical scanning exposure device is confined only to a length defined by the length of the original. The copying apparatus in accordance with the present invention is further characterized in that the standard line of the original to be copied is set towards the cutter device and the photosensitive sheet is cut in the same length with that of the original by synchronizing the feeding operation of the photosensitive sheet and the driving operation of the scanning exposure device and further, a contrast image of the original is focused into the image on the cut photosensitive sheet as it arrives at the corresponding position of the original by scanning the original with the scanning exposure device.

Further features and advantages of the present invention will be apparent from the ensuing description with reference to the accompanying drawings to which the scope of the invention is no way limited.

Figure 2:
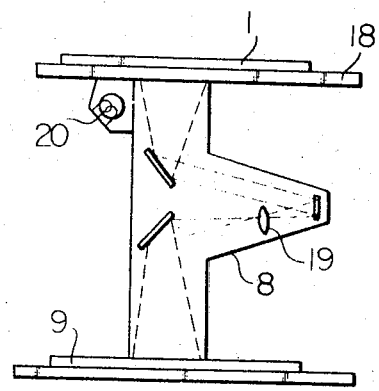
Figure 3:
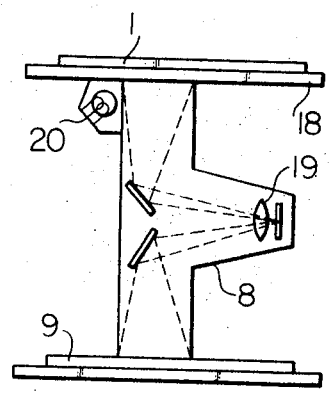
Figure 4:
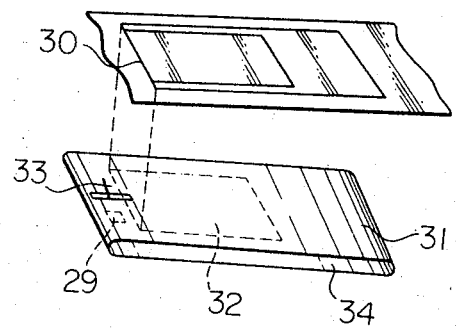
Figure 5:
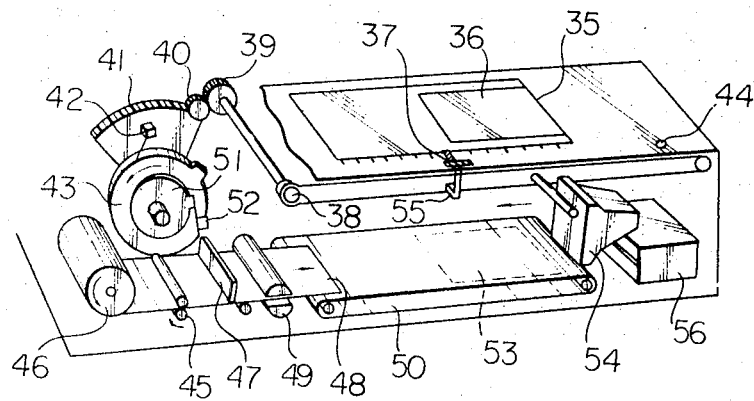

FIG. 1 is a perspective view with part of the apparatus removed showing the copying apparatus in accordance with the present invention, FIGS. 2 and 3 are explanatory diagrams showing the scanning exposure mechanisms of the copying apparatus shown in FIG. 1, in which the image of the original is focused into the image on the photosensitive sheet materials, FIG. 4 is an explanatory diagram showing another embodiment for determining the exposure position of the photosensitive sheet material in accordance with the copying apparatus shown in FIG. 1, FIG. 5 is a perspective view with part of the apparatus removed showing the conventional copying apparatus which is shown for comparing the performance with that of the present invention, FIGS. 6, 7, 8 and 9 are explanatory drawings showing copying speeds of the copying apparatuses shown in FIG. 1 and FIG. 5, respectively, for comparing the copying speeds with each other.

Referring to FIGS. 1 to 4, an example of the copying apparatus in accordance with the present invention is illustrated in FIG. 1. In this copying apparatus, as already described above, the table for the original and the photosensitive sheet are stationarily positioned but the lens system only is movable. The construction of such a scanning exposuring system is illustrated in FIGS. 2 and 3; that is, the contrast image of an original 1 is focused into an image on a photosensitive sheet 7, with is situated parallel to a supporting glass 18 for supporting the original 1, applying three reflector mirrors and a single lens 19 so that they illuminate the original through the supporting glass 18 from a lamp 20. Therefore, a scanning exposure device 8 can be displaced in the range of the original sheet length at a speed which is determined in accordance with the sensitiveness of the photosensitive sheet 9 and the brightness of the lamp 20 etc.

Many attempts have been tried for cutting the photosensitive sheet to the same length as that of an original. For example, one of the conventional methods for cutting the photosensitive sheet in accordance with a length of an original is that the length of the original is firstly detected by a suitable means and secondly the sheet is cut during supplying of a continuous photosensitive sheet material at a constant speed at an intervened time corresponding to the length of the original. In the above-mentioned cutting method, a signal for actuating the cutting means is generated by a mechanical or electrical means at a certain time interval corresponding to the length of the original, or by adjusting a position of a limit switch for actuating the cutting means by utilizing a mechanical means related to the means for detecting a length of the original or by pushing the limit switch in accordance with a motion of the sheet supplying means.

In the copying apparatus of the present invention, the cutting operation of the photosensitive sheet is carried out by utilizing a transfer motion of the scanning exposure device. In other words, the scanning exposure device commences its advance motion from a fixed starting point facing an end of an original positioned upon the transparent plate and is transferred at an equivalent transfer speed with that of the photosensitive sheet which is delivered from a delivery roller. And then, if the scanning exposure device contacts a limit switch which is positioned at a preferable position defined by another end of the original; that is, the size of the original, the displacement of the scanning exposure device is stopped at that position so as to concurrently cut the photosensitive sheet material in the same length as that of the original by the cutting means. Immediately thereafter, the photosensitive sheet material, which is cut in the same length as that of the original, is fed to the prescribed exposure position facing the original and stopped. And then, the scanning exposure device is returned to its fixed starting position while focusing an image of the original into an image on the photosensitive sheet.

Usually, the sizes of the originals are not limited to a maximum size which is specified by the copying apparatus, therefore, since the time required for the scanning operation and displacing the cut piece of photosensitive sheet to the exposure position depends upon the size of the originals in the present method, the copying efficiency will be remarkably improved by applying the present invention.

Next, the copying process in accordance with the present invention will be explained in detail referring to the electrophoto copying apparatus shown in FIG. 1. In the present invention, a standard line 2 of an original 1 is positioned on the side of a cutting means. Limit-switches 4 and 5 are mounted on the knob 3 of a scaler. The position of the knob 3 of the scaler is set at a position corresponding to the standard line of the original 1. As an operation switch 16 is switched on, a pair of feed rollers 15 rotates, and a photosensitive sheet 7 is delivered from a sheet roll 6. At the same time, a scanning exposure device 8 commences its advance motion from a fixed starting position corresponding to the standard line 2 and is displaced at the equal speed as that of the photosensitive sheet 7 in the same direction. (The direction of the above-mentioned displacement of the scanning exposure device 8 is hereinafter referred to as a forward direction.) As the scanning exposure device 8 contacts limit switch 4, the scanning exposure device 8 is stopped at that position, then, the photosensitive sheet 7 is cut by cutting device 17 to an equal length as that of the original 1. In a case of electrophotography, the cut photosensitive sheet 9 is displaced onto an endless feed belt 11 by way of an electrocharger 10 and stopped as it contacts limit-switch 5. At that time, the sheet is positioned directly below the original 1 in a superposed condition. Simultaneously, the illuminating lamp 12 of the scanning exposure device 8 is lighted. Then, the scanning operation of the original 1 is carried out so that an image of the original 1 is focused into an image on the cut photosensitive sheet 9 and simultaneously, the scanning exposure device 8 is returned to its original position. As the scanning exposure device 8 is returned to a position corresponding to the standard line 2 and contacts the fixed starting point or the limit-switch 13, the next photosensitive sheet is supplied and the scanning exposure device is displaced forward, simultaneously. The above-described operation is repeated continuously during the copying process.

The exposed photosensitive sheet 9 is carried to a developing means 14 by the endless feed belt 11 and then discharged outside of the apparatus.

In FIG. 1, the photosensitive sheet 9 is stopped as the limit-switch 5 is contacted with a tip of the photosensitive sheet 9. However, as shown in FIG. 4, if a limit-switch 29 is fixed at a position which corresponds to a standard line 30 of an original, then a photosensitive sheet 32 is stopped when the photosensitive sheet 32 on an endless belt 31 actuates an actuating lever 33 of the limit-switch 29, and the construction of the device becomes more simplified. The above-mentioned mechanism is achieved by using a simple relay mechanism.

Figure 6:
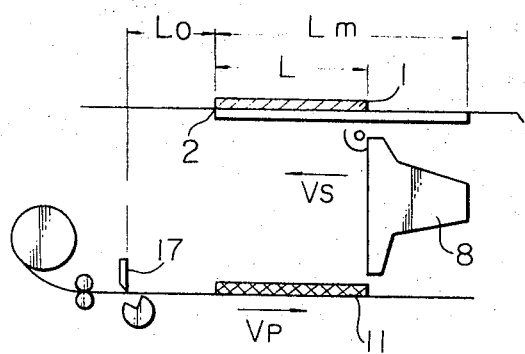

Referring to FIG. 6, the copying efficiency of the copying apparatus according to the present invention is calculated as follows; that is, the copying cycle time $T$ is represented as $$T = (Lo + L)/Vp + L/Vs$$

where,

Lo: distance from a standard line 2 of an original to a position of a cutting device 17,
L: optional length of the original,
Vp: speed of the endless feed belt 11,
Vs: scanning speed of the scanning exposure device 8.

Thus, the number $M$ of the sheets which can be copied in a minute is represented by the following equation;

$$M = 60/T = 60/\left(\frac{Lo}{Vp} + \frac{L}{Vp} + \frac{L}{Vs}\right) \quad (1)$$

Figure 7:
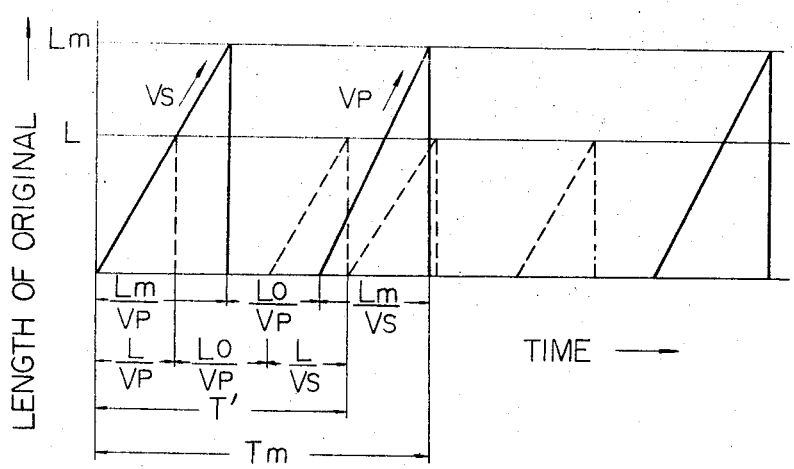
Figure 8:
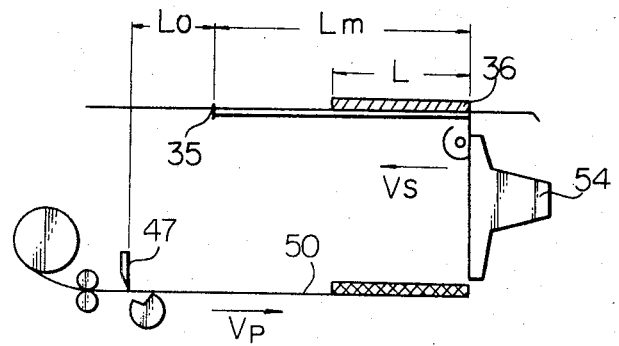

As shown in FIG. 7, the distance $Lo$ is constant, however, the copying cycle time is variable with the optional length $L$ of the original.

Next, for the sake of comparison of the copying efficiency, the copying speed of the electro-photo copying apparatus which is already on the market will be estimated with respect to that of the copying apparatus in accordance with the present invention. For the convenience of explanation, the functions of the conventional electro-photo copying apparatus will be firstly explained referring to FIGS. 5, 8 and 9. That is in FIG. 5, an end of an original 36 is positioned at a standard line 35 while a knob of a scaler 37 is positioned at another end of the original 36, and a large gear 41 is rotated by way of a pulley 38 which is connected to the knob 37 and gears 39 and 40.

A limit-switch 42 is mounted on the large gear 41 so as to orbit about a circumference of a cam 43 which is rotated at a constant speed. When an operation switch 44 is switched on, the cam 43 begins to rotate at a constant speed and then a pair of feed rollers 45 are rotated by way of a driving mechanism connected to the cam 43. A photosensitive sheet 53 is supplied from a sheet roll 46. When the cam 43 contacts the limit switch 42 the rotation of the feed rollers 45 is stopped at that position, and at the same time, the photosensitive sheet 53 is cut by a cutting device 47 so that the cut sheet 48 has the same length as the original 36. In a case of electrophotography, the cut photosensitive sheet 48 is displaced forward by an endless feed belt 50 and passed through an electrocharger 49. When the photosensitive sheet 53 arrives just at the underside of the original 36, the endless feed belt 50 is stopped when another cam 51 rigidly mounted on the cam 43 pushes a limit switch 52. At the same time, a scanning exposure device 54 is displaced towards the cutting device 47 while focusing an image of the original 36 onto the photosensitive sheet 53. At the end of scanning, a limit switch 55 secured to the scaler 37 is pushed by the scanning exposure device 54 and then the scanning exposure device 54 is returned to its original position. Subsequently, the next photosensitive sheet is supplied from the sheet roll 46. The exposed photosensitive sheet 53 is displaced forward by means of the endless feed belt 50 and discharged to the outside of the apparatus after being treated by a developing device 56.

In the above-mentioned case, the cutting cycle time $T'$ is calculated by the following equation as already mentioned above. (referring to FIG. 8)

$$T' = (Lm + Lo)/Vp + L/Vs$$

where,

Lm: the maximum length of an original to be copied, Lo: distance from the standard line 35 to the cutting device 47,
Vp: speed of the feed belt 50,
Vs: scanning speed of the original 36 by the scanning exposure device 54,
L: length of original 36 which is to be copied,
T': cutting cycle time.

Thus, the number $M'$ of sheets which can be copied in a minute is calculated by the following equation (2)

$$M' = 60/T' = 60/\left(\frac{Lo}{Vp} + \frac{Lm}{Vp} + \frac{L}{Vs}\right) \quad (2)$$

Figure 9:
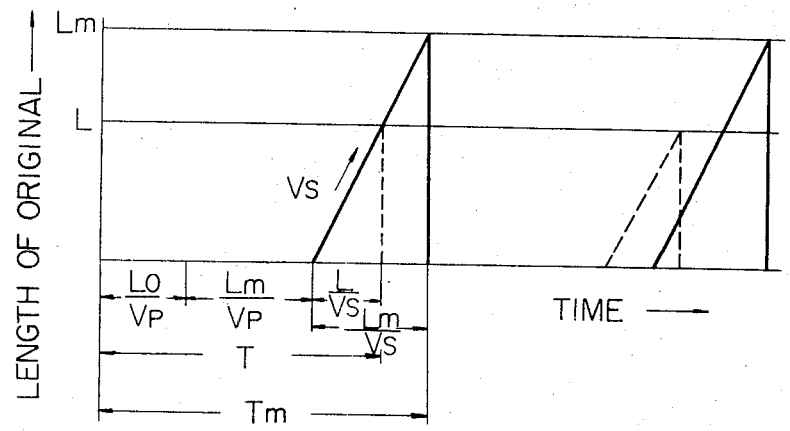

As shown in FIG. 9, Lo and Lm are constant, but the time $T'$ is variable with L.

The difference between both equations (1) and (2) is the second term of the denominator, that is, in the latter equation, $Lm/Vp$ is constant, however, in the former it becomes smaller as L decreases. Therefore, in the former method that is, the present method the number of copied sheets per unit time increases as L becomes smaller. In order to clarify the above-mentioned features of the present invention, the copying speed of the above-mentioned two methods is compared in three cases of the original lengths; $L = 37$ cm, 27 cm and 14 cm. From the above calculation, the increment of copying efficiency with the decrease of the size of the originals is obvious as shown in Table 1.

TABLE 1

Copying number of sheet per minute

| L: Length of original to be copied (cm) | 37 | 20 | 14 |
|---|---|---|---|
| Conventional apparatus shown in Fig. 5 | 10.2 | 12.7 | 13.8 |
| Apparatus of the present invention shown in Fig. 1 | 10.2 | 16.7 | 21.3 |

Further, in the copying apparatus of the present invention it is possible to regulate the copying operations with such a simple mechanism as a limit-switch without utilizing complicated cam mechanisms as shown in FIG. 5. And substantially excellent copying efficiency is attained by applying the present invention in accordance with decreasing of the original size.

What we claimed is:

1. A method for copying an original placed in a stationary position in a copying apparatus having an exposure device for scanning photosensitive sheet material fed through the apparatus in a forward direction, comprising
   a. positioning said original so that a rearward edge thereof is at a fixed starting line on said apparatus;
   b. positioning said scanning exposure device in alignment with said fixed starting line in a passage spacing between said original and said sheet material;
   c. feeding the photosensitive sheet material along a passage parallel to said original and spaced therefrom;
   d. displacing said exposure device to move in a forward direction in the passage spacing synchronously with the feed movement of said sheet material in the same direction;
   d. stopping said exposure device and sheet material feed when said exposure device reaches alignment with a stop line on said apparatus corresponding to the positioning of a forward edge of said original;
   f. cutting said sheet material in its stopped position so that a sheet cut thereby has the same length as said original;
   g. further feeding said cut sheet forwardly to an exposure position facing said original and in alignment therewith;
   h. stopping said cut sheet at said exposure position; and
   i. displacing said exposure device in a rearward direction to scan said original and thereby return to said alignment with said fixed starting line whereby an image of said original is focused into an image upon said cut sheet.

2. A method according to claim 1 wherein the synchronous displacement of said exposure device and the forward feed movement of said sheet material is at the same speed.

3. A method according to claim 1 wherein the stop line is variably located corresponding to the length of said original.

4. A method according to claim 1 wherein the stop line is determined by placement of actuating means in alignment with the forward edge of said original, and the synchronous displacement of said exposure device is stopped by said exposure device contacting said actuating means.

5. A method according to claim 1 wherein the movement of said cut sheet is stopped at said exposure position by said cut sheet contacting first control means placed in alignment with the forward edge of said original.

6. A method according to claim 1 wherein the movement of said cut sheet is stopped at said exposure position by said cut sheet actuating second control means placed in alignment with the rearward edge of said original.

7. Apparatus for copying an original placed in a stationary position thereon having an exposure device for scanning photosensitive sheet material fed through the apparatus in a forward direction, comprising
   a. a transparent glass plate on which said original is placed, said plate having a fixed starting line on which a rearward edge of said original is aligned;
   b. a passage spaced from said glass plate and extending parallel thereto;
   c. means for feeding the photosensitive sheet material along said passage parallel to said original and spaced therefrom;
   d. said scanning exposure device positionable in alignment with said fixed starting line in said passage between said original and said photosensitive sheet material;
   e. cutting means located rearwardly of said fixed starting line and in line with said passage;
   f. said plate having a stop line on which a forward edge of said original is aligned;
   g. said scanning exposure device displaceable in a forward direction from said alignment with said fixed starting line simultaneously with forward movement of said photosensitive sheet material, said scanning exposure device movable to a stopping position in alignment with said plate stop line;
   h. actuating means for said cutting means mounted on said apparatus in alignment with said plate stop line; said actuating means operable by said scanning exposure device reaching said plate stop line thereby actuating said cutting means to cut a sheet from said photosensitive sheet material to have the same length as said original;
   i. means moving said cut sheet through said passage to stop an exposure position parallel to said original and in alignment therewith; and
   j. said scanning exposure device rearwardly movable from said alignment with said plate stop line to scan said original and thereby return to said alignment with said fixed starting line whereby an image of said original is focused upon said cut sheet.

8. Apparatus according to claim 7 wherein said actuating means is adjustably mounted on said apparatus to be aligned with the forward edge of a selected original from a group of originals varying in length.

9. Apparatus according to claim 7 wherein first control means is mounted on said apparatus in alignment with said plate stop line, said control means being contacted by said forward edge of said cut sheet to stop said cut sheet movement.

10. Apparatus according to claim 7 wherein second control means is mounted on said apparatus in alignment with said fixed starting line, said second control means being actuated by said rearward edge of said cut sheet to stop said cut sheet movement.

* * * * *

UNITED STATES PATENT OFFICE
CERTIFICATE OF CORRECTION

Patent No. 3,656,851　　　　　　Dated　April 18, 1972

Inventor(s)　Shunichiro Kakii, et al.

It is certified that error appears in the above-identified patent and that said Letters Patent are hereby corrected as shown below:

Column 3, line 26,　delete "a" and insert -- the fixed starting point or the --;

Column 3, line 27,　delete "the fixed starting point or the" and insert -- a --;

Column 4, line 33,　delete "Lo:";

Column 4, line 34,　before "distance" insert -- Lo: --;

Column 4, line 51,　after "in the former method" insert -- ; --;

Column 6, line 31,　after "stop" insert -- at --.

Signed and sealed this 29th day of August 1972.

(SEAL)
Attest:

EDWARD M. FLETCHER, JR.　　　　　　　ROBERT GOTTSCHALK
Attesting Officer　　　　　　　　　　　Commissioner of Patents